(12) United States Patent
Zhao

(10) Patent No.: US 9,049,183 B2
(45) Date of Patent: Jun. 2, 2015

(54) ETHERNET BASE, NETWORK SYSTEM, AND DATA FORWARDING METHOD

(71) Applicant: Huawei Device Co., Ltd., Shenzhen, Guangdong (CN)

(72) Inventor: Yang Zhao, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 294 days.

(21) Appl. No.: 13/681,711

(22) Filed: Nov. 20, 2012

(65) Prior Publication Data
US 2013/0163613 A1 Jun. 27, 2013

(30) Foreign Application Priority Data

Nov. 25, 2011 (CN) .......................... 2011 1 0380477

(51) Int. Cl.
*H04L 29/06* (2006.01)
*G06F 13/38* (2006.01)
(Continued)

(52) U.S. Cl.
CPC .............. *H04L 69/08* (2013.01); *G06F 13/387* (2013.01); *G06F 2213/0042* (2013.01); *G06F 2213/3808* (2013.01); *H04L 12/403* (2013.01); *H04L 12/413* (2013.01)

(58) Field of Classification Search
CPC .............. H04L 29/06163; H04L 12/56; H04L 2012/56; H04L 29/0653; H04L 29/06095; H04L 12/413; H04L 12/2405; H04L 41/0226; H04L 69/08; H04L 12/403; G06F 2213/0042; G06F 13/387

USPC ......... 370/465, 466, 467, 252, 254, 389, 359, 370/392

See application file for complete search history.

(56) References Cited

U.S. PATENT DOCUMENTS

2007/0016714 A1* 1/2007 Huotari et al. ................ 710/313
2008/0212568 A1 9/2008 So et al.
(Continued)

FOREIGN PATENT DOCUMENTS

CN 101291339 A 10/2008
CN 101557396 A 10/2009
(Continued)

OTHER PUBLICATIONS

International Search Report in corresponding PCT Patent Application No. PCT/CN2012/084585 (Feb. 28, 2013).
(Continued)

*Primary Examiner* — Anh Ngoc Nguyen
(74) *Attorney, Agent, or Firm* — Leydig, Voit & Mayer, Ltd.

(57) ABSTRACT

The present invention discloses an Ethernet base, a network system, and a data forwarding method. The Ethernet base receives service data which is in a USB format and sent by a 3G router, and after converting the service data in the USB format into service data in an Ethernet format, sends the service data in the Ethernet format to a fixed network router. The Ethernet base further performs software configuration on its USB unit, so as to enable the USB unit to fulfill a hardware time sequence function of a USB host device. According to embodiments of the present invention, network traffic of the 3G router can be switched to the fixed network router without modifying basic architecture of the 3G router; and a USB interface of the Ethernet base supports charging the 3G router simultaneously in a process of data transmission.

7 Claims, 3 Drawing Sheets

(51) Int. Cl.
*H04L 12/403* (2006.01)
*H04L 12/413* (2006.01)

(56) References Cited

U.S. PATENT DOCUMENTS

| | | | |
|---|---|---|---|
| 2009/0031069 | A1 | 1/2009 | Habuto et al. |
| 2010/0318715 | A1 | 12/2010 | Young |
| 2011/0138196 | A1 | 6/2011 | Magnuson et al. |
| 2011/0164598 | A1 | 7/2011 | Lee et al. |
| 2011/0280175 | A1 * | 11/2011 | Yamada et al. ............... 370/315 |

FOREIGN PATENT DOCUMENTS

| | | |
|---|---|---|
| CN | 101938077 A | 1/2011 |
| CN | 102104554 A | 6/2011 |
| CN | 102523637 A | 6/2012 |
| EP | 2264611 A1 | 12/2010 |

OTHER PUBLICATIONS

Extended European Search Report in corresponding European Patent Application No. 12187975.3 (Mar. 13, 2013).

* cited by examiner

ETHERNET BASE, NETWORK SYSTEM, AND DATA FORWARDING METHOD

CROSS-REFERENCE TO RELATED APPLICATION

This application claims priority to Chinese Patent Application No. 201110380477.3, filed on Nov. 25, 2011, which is hereby incorporated by reference in its entirety.

FIELD OF THE INVENTION

The present invention relates to the field of communication technologies, and in particular, to an Ethernet base, a network system, and a data forwarding method.

BACKGROUND OF THE INVENTION

A portable 3G (3rd-generation, the third generation mobile communication technology) router has characteristics of being handy, small, and exquisite, is convenient to carry, can meet a user's demand for accessing the Internet anytime anywhere, and is more and more widely applied. However, a problem of occupying too many 3G bandwidths of an operator also exists. In an application scenario where there is a fixed network access resource, such as home and office, if network traffic of a user can be switched from the 3G to a fixed network router, not only an access rate can be increased, but also traffic can be shared for a 3G network of the operator.

In the prior art, a universal serial BUS (Universal Serial BUS, hereinafter referred to as USB) to Ethernet chip is adopted to design an Ethernet base, which is used as an accessory of the portable 3G router to provide a fixed network access function for a client. In a specific application, the Ethernet base is connected to the portable 3G router through a USB interface, and is capable of switching the network traffic of the user from the 3G to the fixed network router after being connected to the fixed network router through an Ethernet line.

Currently, a USB of the portable 3G router generally adopts a USB slave (slave device) interface, so as to be compatible with a USB host (host device) interface of a PC machine. However, the USB to Ethernet chip used in an existing Ethernet base generally adopts a USB slave (slave device) interface; therefore, software is needed to transform the USB of the 3G router into a USB host, so as to match an existing USB to Ethernet chip. Moreover, a 3G portable wireless router also needs to provide a USB to Ethernet drive, so as to virtualize a drive of a transceiver packet into a drive of an Ethernet network card; and data forwarding between the USB interface and an Ethernet interface is accomplished by the 3G portable wireless router. Therefore, basic architecture of the portable 3G router needs to be modified. In addition, because the USB of the base fulfills a USB slave function, when the base performs data transmission with the portable 3G router through the USB interface, the portable 3G router cannot be charged simultaneously. Therefore, the portable 3G router and the base both need to add a charging interface, which makes a product structure complex and is adverse to saving of the cost.

SUMMARY OF THE INVENTION

Embodiments of the present invention provide an Ethernet base, a network system, and a data forwarding method, which can switch network traffic of a 3G router to a fixed network router without modifying basic architecture of the 3G router; and a USB interface of the Ethernet base supports charging the 3G router in a process of data transmission.

An Ethernet base provided in an embodiment of the present invention includes a USB unit, a USB drive unit, an Ethernet drive unit, and an Ethernet unit, where the USB unit is configured to receive first service data which is in a USB format and sent by a 3G router;

the USB drive unit is configured to convert the first service data in the USB format into second service data in an Ethernet format, and is further configured to perform software configuration on the USB unit, so as to enable the USB unit to fulfill a hardware time sequence function of a USB host device;

the Ethernet drive unit is configured to send the second service data in the Ethernet format to the Ethernet unit; and the Ethernet unit is configured to send the second service data in the Ethernet format to a fixed network router.

A network system provided in an embodiment of the present invention includes a wireless Internet access terminal, a 3G router, an Ethernet base, and a fixed network router, where the wireless Internet access terminal is connected to the 3G router through a wireless local area network; the 3G router is connected to the Ethernet base through a USB interface; and the Ethernet base is connected to the fixed network router through an Ethernet line;

the wireless Internet access terminal transfers first service data to the 3G router; the 3G router performs route forwarding and network address translation on the first service data, and sends first service data in a USB format to the Ethernet base through the USB interface; and the Ethernet base includes a USB unit, a USB drive unit, an Ethernet drive unit, and an Ethernet unit, where the USB unit is configured to receive the first service data which is in the USB format and sent by the 3G router; the USB drive unit is configured to convert the first service data in the USB format into second service data in an Ethernet format, and is further configured to perform software configuration on the USB unit, so as to enable the USB unit to fulfill a hardware time sequence function of a USB host device; the Ethernet drive unit is configured to send the second service data in the Ethernet format to the Ethernet unit; and the Ethernet unit is configured to send the second service data in the Ethernet format to the fixed network router.

A data forwarding method provided in an embodiment of the present invention includes:

transferring, by a wireless Internet access terminal, first service data to a 3G router through a wireless local area network;

performing, by the 3G router, route forwarding and network address translation on the first service data, and sending first service data in a USB format to an Ethernet base through a USB interface;

converting, by the Ethernet base, the first service data in the USB format into second service data in an Ethernet format, and further performing, by the Ethernet base, software configuration on its USB unit, so as to enable the USB unit to fulfill a hardware time sequence function of a USB host device; and sending, by the Ethernet base, the second service data in the Ethernet format to a fixed network router.

The Ethernet base, the network system, and the data forwarding method provided in the embodiments of the present invention have the following beneficial effects:

In an application scenario where there is a fixed network access resource, such as home and office, the Ethernet base is used with the 3G router (especially a portable 3G router), so as to switch network traffic of a user from a 3G network to the fixed network router, which not only increases an access rate, but also shares traffic for a 3G network of an operator. Moreover, the Ethernet base supports a bridging function between a USB interface and an Ethernet interface, so as to complete data forwarding between the USB interface and the Ethernet interface, and switch the network traffic of the 3G router to the fixed network router without modifying the basic architecture of the 3G router. In addition, because a USB of the base fulfills a USB host function and a USB of the 3G router fulfills a USB slave function, the Ethernet base can charge the 3G router simultaneously when performing data transmission with the 3G router through the USB interface.

DETAILED DESCRIPTION OF THE EMBODIMENTS

The technical solutions of the embodiments of the present invention are described clearly and completely below with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 1:
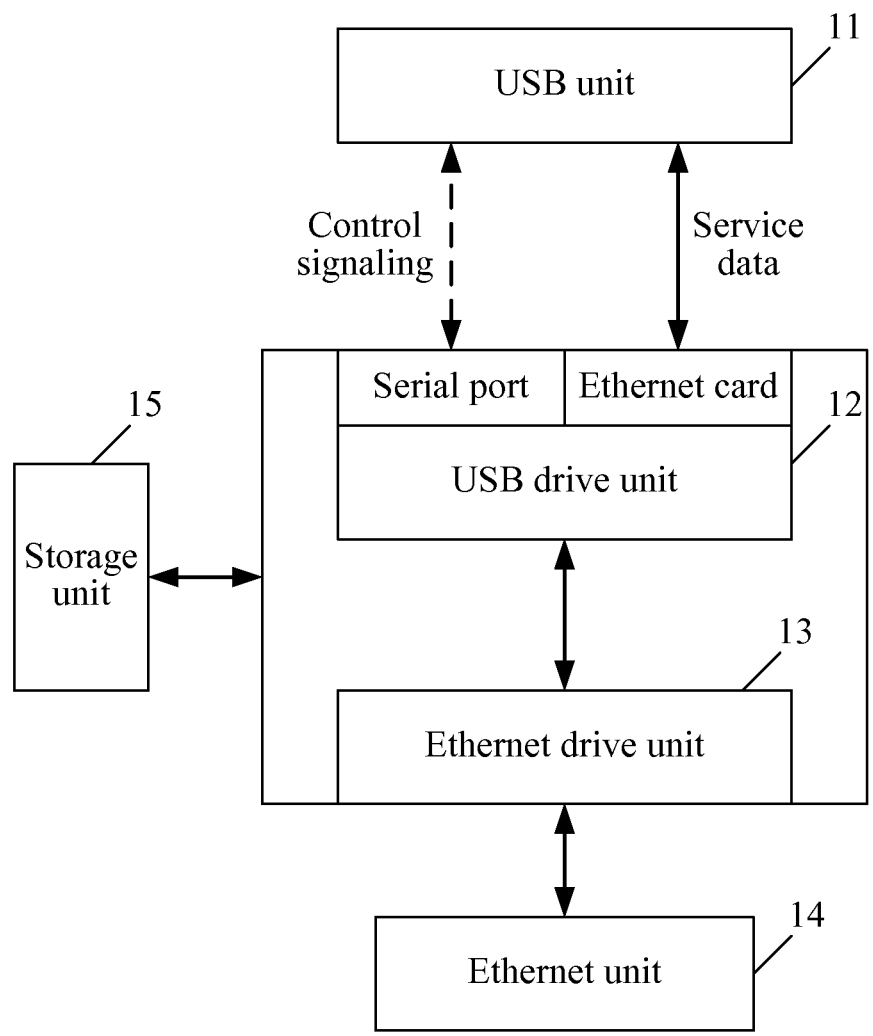
FIG. 1 is a schematic structural diagram of an Ethernet base according to a first embodiment of the present invention.

Referring to FIG. 1, FIG. 1 is a schematic structural diagram of an Ethernet base according to a first embodiment of the present invention.

The Ethernet base provided in the embodiment includes a USB unit 11, a USB drive unit 12, an Ethernet drive unit 13, and an Ethernet unit 14. The Ethernet base is capable of switching network traffic from a 3G network to a fixed network router, which is specifically as follows:

the USB unit 11 is configured to receive first service data which is in a USB format and sent by a 3G router;

the USB drive unit 12 is configured to convert the first service data in the USB format into second service data in an Ethernet format, and is further configured to perform software configuration on the USB unit 11, so as to enable the USB unit 11 to fulfill a hardware time sequence function of a USB host device (that is, USB host);

the Ethernet drive unit 13 is configured to send the second service data in the Ethernet format to the Ethernet unit 14; and the Ethernet unit 14 is configured to send the second service data in the Ethernet format to a fixed network router.

In addition, the Ethernet base provided in the embodiment of the present invention further forwards an Internet (hereinafter referred to as Internet) backhaul IP (IP is short for the Internet Protocol, and the full name is "Protocol for Interconnection Between Networks") data packet from a fixed network to the 3G router, which is specifically as follows:

the Ethernet unit 14 is further configured to receive third service data which is in the Ethernet format and sent by the fixed network router;

the Ethernet drive unit 13 is further configured to convert the third service data in the Ethernet format into fourth service data in the USB format;

the USB drive unit 12 is further configured to send the fourth service data in the USB format to the USB unit 11; and the USB drive unit 11 is further configured to send the fourth service data in the USB format to the 3G router.

The USB drive unit 12 includes a serial interface and an Ethernet network card, where the serial interface is configured to run control signaling, and the Ethernet network card is configured to run service data. The control signaling includes signaling that identifies a device and determines whether a function of an Ethernet interface is a function of a local area network or a function of a wide area network; and the service data includes the foregoing first service data, second service data, third service data, and fourth service data, and is network traffic data.

In an alternative implementation manner, a serial interface and an Ethernet interface are virtualized by the USB drive unit 12. The serial interface is configured to run control signaling, where the control signaling adopts an AT command form that is based on the serial interface, so as to implement information exchange between the Ethernet base and the 3G router. The control signaling includes signaling that identifies a device and determines whether a function of an Ethernet interface is a function of an LAN (Local Area Network, local area network) or a function of a WAN (Wide Area Network, wide area network), and so on. The Ethernet interface is configured to run service data, where the service data includes the foregoing first service data, second service data, third service data, and fourth service data, and is network traffic data.

Further, as shown in FIG. 1, the Ethernet base provided in the embodiment of the present invention further includes a storage unit 15 that is configured to store a program code and service data.

In the Ethernet base provided in the embodiment of the present invention, the Ethernet interface supports a wide area network or local area network function. The Ethernet base supports the bridging function between the USB interface and the Ethernet interface, and meets PPPOE (PPPOE is short for point-to-point protocol over ethernet) initiated from the 3G router, or a home solution to a portable router, where the USB interface works as a wide area network interface in the home solution to the portable router, so as to support an uplink function of the fixed network. In an application scenario where there is a fixed network access resource, such as home and office, the Ethernet base is used in conjunction with the 3G router so as to switch the network traffic of the user from the 3G network to the fixed network router, which not only increases an access rate, but also shares traffic for a 3G network of an operator.

Figure 2:
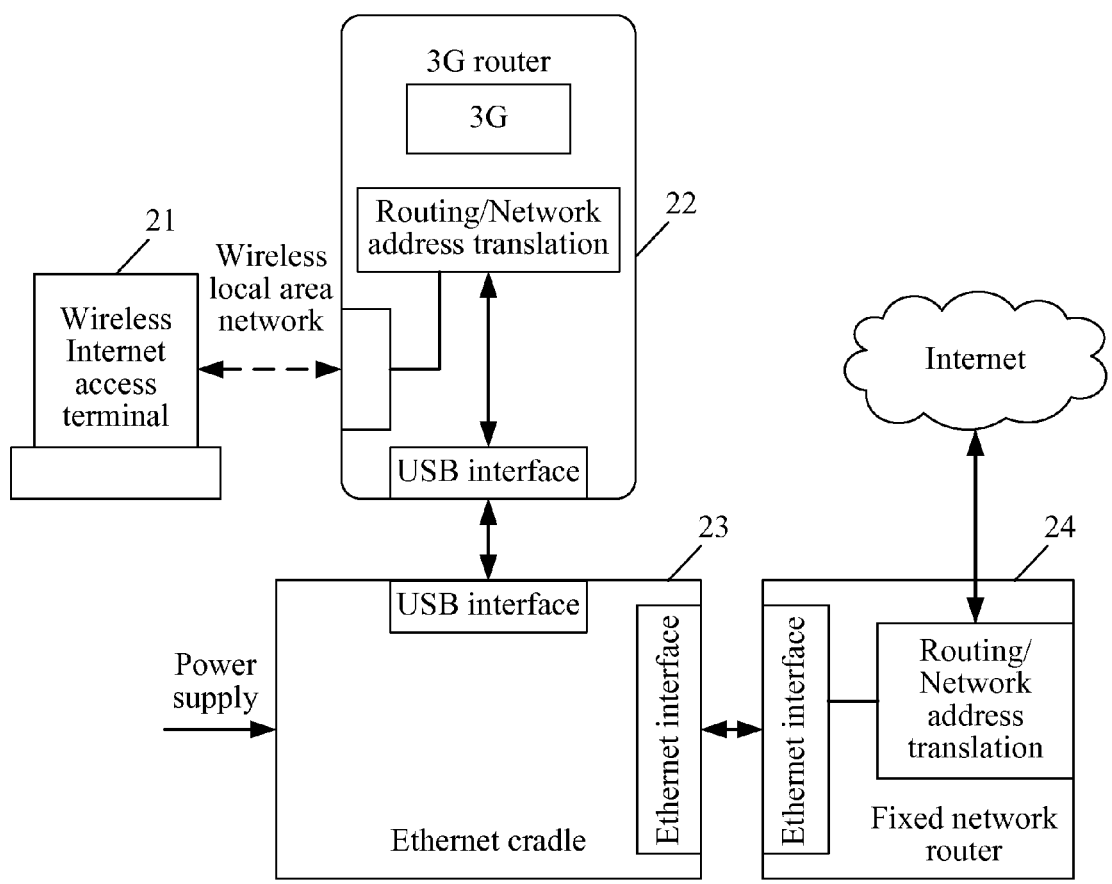
FIG. 2 is a schematic structural diagram of a network system according to a second embodiment of the present invention.

The following describes in detail a network system to which an Ethernet base is applicable with reference to FIG. 2.

Referring to FIG. 2, FIG. 2 is a schematic structural diagram of a network system according to a second embodiment of the present invention;

The network system provided in the embodiment includes a wireless Internet access terminal 21, a 3G router 22, an Ethernet base 23, and a fixed network router 24. Specifically, the wireless Internet access terminal 21 is connected to the 3G router 22 through a wireless local area network (Wireless Local Area Network, WLAN); the 3G router 22 is connected to the Ethernet base 23 through a USB interface; and the Ethernet base 23 is connected to the fixed network router 24 through an Ethernet line.

The wireless Internet access terminal 21 includes a device with a wireless network card or a wifi function, such as a computer, a mobile phone, and a personal digital assistant. The wireless Internet access terminal 21 transfers first service data to the 3G router 22; the 3G router 22 performs route forwarding and network address translation on the first service data, and sends first service data in a USB format to the Ethernet base 23 through the USB interface.

The Ethernet base 23 provided in the embodiment includes a USB unit, a USB drive unit, an Ethernet drive unit, and an Ethernet unit, is similar to the Ethernet base provided in the foregoing first embodiment, and is not repeatedly described here.

In the network system provided in the embodiment, network traffic of the wireless Internet access terminal can be switched from a 3G network into the fixed network router, and an Internet IP data packet is forwarded from a fixed network to the 3G router. Detailed description is provided below with reference to FIG. 3 and FIG. 4.

Figure 3:
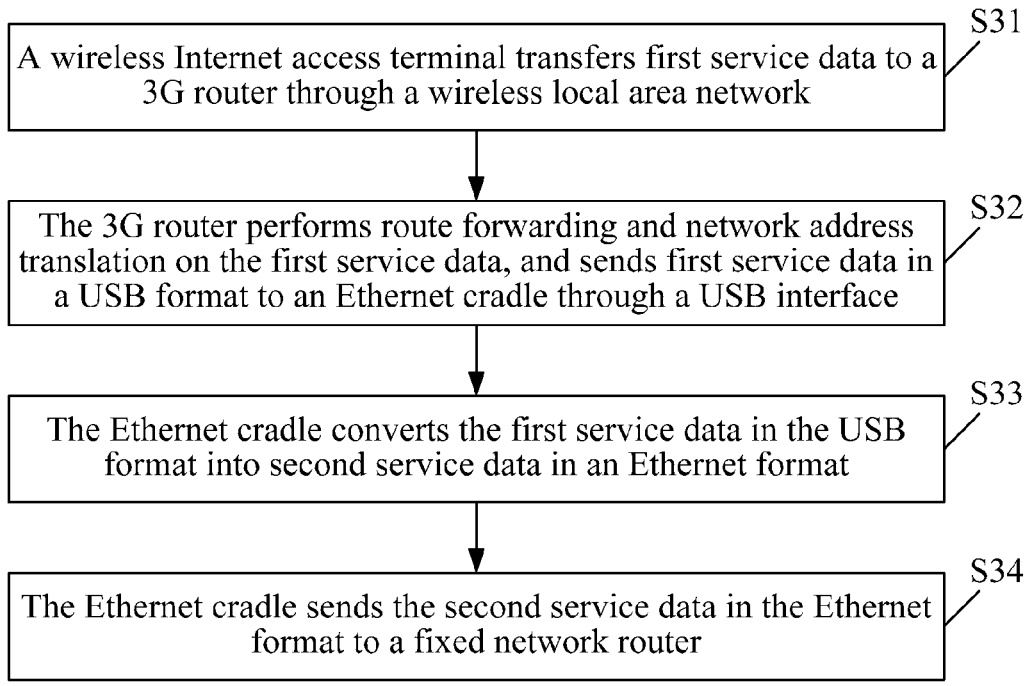
FIG. 3 is a schematic flow chart of a data forwarding method according to a third embodiment of the present invention.

Referring to FIG. 3, FIG. 3 is a schematic flow chart of a data forwarding method according to a third embodiment of the present invention.

In the third embodiment, an Ethernet base switches network traffic of a wireless Internet access terminal from a 3G network to a fixed network router, which is specifically as follows:

Step S31: A wireless Internet access terminal transfers first service data to a 3G router though a wireless local area network.

Specifically, a DHCP (Dynamic Host Configuration Protocol, dynamic host configuration protocol) server of a fixed network router assigns an IP address of a private network to the 3G router; and an IP packet (that is, service data) of the wireless Internet access terminal is transferred to the 3G router through the WLAN.

Step S32: The 3G router performs route forwarding and network address translation (Network Address Translation, NAT) on the first service data, so as to change an source IP address, and sends first service data in a USB format to an Ethernet base though a USB interface.

Step S33: The Ethernet base converts the received first service data in the USB format into second service data in an Ethernet format; and the Ethernet base further performs software configuration on its USB unit, so as to enable the USB unit to fulfill a hardware time sequence function of a USB host device (that is, USB host).

Step S34: The Ethernet base sends the second service data in the Ethernet format to the fixed network router.

The fixed network router performs route forwarding and NAT after receiving the second service data, so as to change the source IP address again and transfer a data packet to an external network (Internet).

Figure 4:
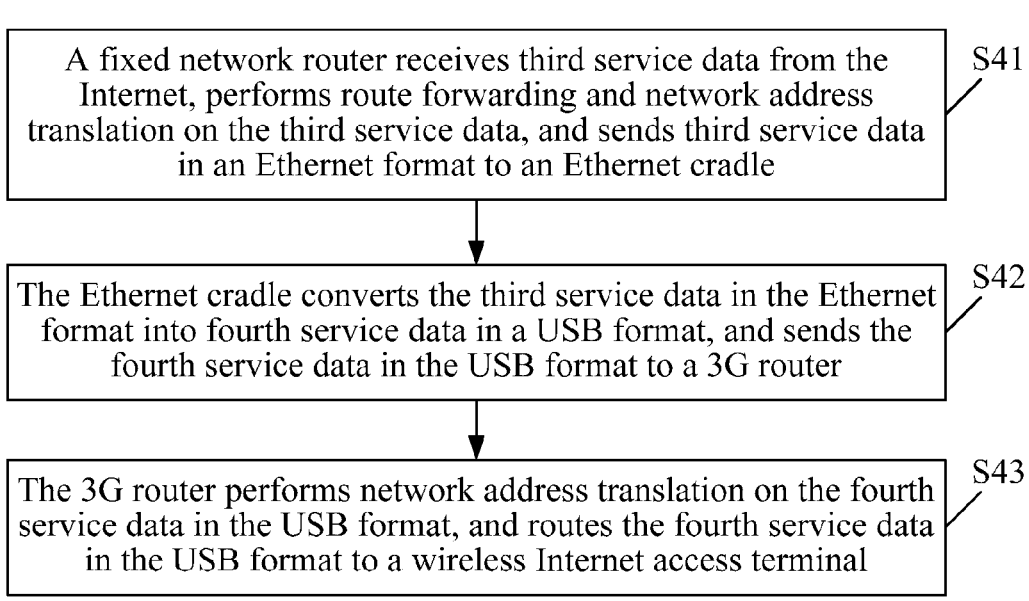
FIG. 4 is a schematic flow chart of a data forwarding method according to a fourth embodiment of the present invention.

Referring to FIG. 4, FIG. 4 is a schematic flow chart of a data forwarding method according to a fourth embodiment 4 of the present invention.

In the fourth embodiment, an Ethernet base forwards an Internet IP data packet from a fixed network to a 3G router, which is specifically as follows:

Step S41: A fixed network router receives third service data from the Internet, performs route forwarding and network address translation on the third service data, and sends third service data in an Ethernet format to an Ethernet base.

Specifically, the fixed network router receives a backhaul data packet from the Internet, searches for an Ethernet interface according to a NAT rule, forwards the data packet to the Ethernet interface that is connected to the Ethernet base, and changes a destination IP address according to the NAT rule simultaneously.

Step S42: The Ethernet base converts the third service data in the Ethernet format into fourth service data in a USB format, and sends the fourth service data in the USB format to a 3G router.

Step S43: The 3G router performs network address translation on the fourth service data in the USB format, and routes the fourth service data in the USB format to a wireless Internet access terminal.

Specifically, after receiving, through a USB interface, the data packet sent by the Ethernet base, the 3G router performs network address translation once again according to the NAT rule, and routes the data packet to a corresponding wireless Internet access terminal according to a translated destination IP address.

According to the Ethernet base provided in the embodiment of the present invention, in an application scenario where there is a fixed network access resource, such as home and office, the Ethernet base is used with the 3G router (especially a portable 3G router), so as to switch network traffic of a user from a 3G network to the fixed network router, which not only increases an access rate, but also shares traffic for a 3G network of an operator. Moreover, the Ethernet base supports a bridging function between a USB interface and an Ethernet interface, so as to complete data forwarding between the USB interface and the Ethernet interface, and switch network traffic from the 3G router to the fixed network router without modifying basic architecture of the 3G router. In addition, because a USB of the base fulfills a USB host function and a USB of the 3G router fulfills a USB slave function, the Ethernet base can charge the 3G router simultaneously when performing data transmission with the 3G router through the USB interface.

The foregoing describes preferred implementation manners of the present invention. It should be noted that, persons of ordinary skill in the art may further make several improvements and modifications without departing from the principles of the present invention, and these improvements and modifications are also subject to the protection scope of the present invention.

What is claimed is:

1. An Ethernet base, comprising a Universal Serial BUS (USB) unit, a USB drive unit, an Ethernet drive unit, and an Ethernet unit, wherein:
   the USB unit is configured to receive first service data which is in a USB format and sent by a third generation mobile communication technology (3G) router;
   the USB drive unit is configured to convert the first service data in the USB format into second service data in an Ethernet format, and is further configured to perform software configuration on the USB unit, so as to enable the USB unit to fulfill a hardware time sequence function of a USB host device;
   the Ethernet drive unit is configured to send the second service data in the Ethernet format to the Ethernet unit;
   the Ethernet unit is configured to send the second service data in the Ethernet format to a fixed network router;
   the Ethernet unit is further configured to receive third service data which is in the Ethernet format and sent by the fixed network router;
   the Ethernet drive unit is further configured to convert the third service data in the Ethernet format into fourth service data in the USB format;

the USB drive unit is further configured to send the fourth service data in the USB format to the USB unit; and the USB unit is further configured to send the fourth service data in the USB format to the 3G router.

2. The Ethernet base according to claim 1, wherein the USB drive unit comprises a serial interface and an Ethernet network card; the serial interface is configured to run control signaling; the Ethernet network card is configured to run service data; and the control signaling comprises signaling that identifies a device and determines whether a function of an Ethernet interface is a function of a local area network or a function of a wide area network.

3. The Ethernet base according to claim 2, wherein the Ethernet base further comprises a storage unit that is configured to store a program code and the service data.

4. A network system, comprising a wireless Internet access terminal, a third generation mobile communication technology (3G) router, an Ethernet base, and a fixed network router, wherein:

the wireless Internet access terminal is connected to the 3G router through a wireless local area network; the 3G router is connected to the Ethernet base through a Universal Serial BUS (USB) interface; the Ethernet base is connected to the fixed network router through an Ethernet line; the wireless Internet access terminal transfers first service data to the 3G router; the 3G router performs route forwarding and network address translation on the first service data, and sends the first service data in a USB format to the Ethernet base through the USB interface;

the Ethernet base comprises a USB unit, a USB drive unit, an Ethernet drive unit, and an Ethernet unit;

the USB unit is configured to receive the first service data which is in the USB format and sent by the 3G router;

the USB drive unit is configured to convert the first service data in the USB format into second service data in an Ethernet format, and is further configured to perform software configuration on the USB unit, so as to enable the USB unit to fulfill a hardware time sequence function of a USB host device;

the Ethernet drive unit is configured to send the second service data in the Ethernet format to the Ethernet unit;

the Ethernet unit is configured to send the second service data in the Ethernet format to the fixed network router;

the Ethernet unit is further configured to receive third service data which is in the Ethernet format and sent by the fixed network router;

the Ethernet drive unit is further configured to convert the third service data in the Ethernet format into fourth service data in the USB format;

the USB drive unit is further configured to send the fourth service data in the USB format to the USB unit; and the USB unit is further configured to send the fourth service data in the USB format to the 3G router.

5. The network system according to claim 4, wherein the USB drive unit comprises a serial interface and an Ethernet network card; the serial interface is configured to run control signaling; the Ethernet network card is configured to run service data; and the control signaling comprises signaling that identifies a device and determines whether a function of an Ethernet interface is a function of a local area network or a function of a wide area network.

6. The network system according to claim 5, wherein the Ethernet base further comprises a storage unit that is configured to store a program code and service data.

7. A data forwarding method, comprising:

transferring, by a wireless Internet access terminal, first service data to a third generation mobile communication technology (3G) router through a wireless local area network;

performing, by the 3G router, route forwarding and network address translation on the first service data, and sending the first service data in a Universal Serial BUS (USB) format to an Ethernet base though a USB interface;

converting, by the Ethernet base, the first service data in the USB format into second service data in an Ethernet format, and performing, by the Ethernet base, software configuration on an USB unit, so as to enable the USB unit to fulfill a hardware time sequence function of a USB host device;

sending, by the Ethernet base, the second service data in the Ethernet format to a fixed network router;

receiving, by the fixed network router, third service data from an Internet, and performing the route forwarding and the network address translation on the third service data, so as to send the third service data in the Ethernet format to the Ethernet base;

converting, by the Ethernet base, the third service data in the Ethernet format into fourth service data in the USB format, and sending the fourth service data in the USB format to the 3G router; and performing by the 3G router, the network address translation on the fourth service data in the USB format, and routing the fourth service data in the USB format to the wireless Internet access terminal.

* * * * *